United States Patent
Rossignol

(10) Patent No.: US 7,072,760 B2
(45) Date of Patent: Jul. 4, 2006

(54) METHOD FOR DETECTING COMBUSTION FAILURE BY FILTERING

(75) Inventor: Alain Rossignol, Toulouse (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 0 days.

(21) Appl. No.: 10/546,062

(22) PCT Filed: Feb. 11, 2004

(86) PCT No.: PCT/EP2004/001247

§ 371 (c)(1),
(2), (4) Date: Aug. 18, 2005

(87) PCT Pub. No.: WO2004/074662

PCT Pub. Date: Sep. 2, 2004

(65) Prior Publication Data

US 2006/0074543 A1    Apr. 6, 2006

(30) Foreign Application Priority Data

Feb. 20, 2003 (FR) .................................. 03 02057

(51) Int. Cl.
*G01M 15/00* (2006.01)
*G06F 19/00* (2006.01)
(52) U.S. Cl. ........................................ 701/111; 73/116
(58) Field of Classification Search ............... 701/111, 701/110, 102, 101; 73/116, 117.3, 118.1
See application file for complete search history.

(56) References Cited

U.S. PATENT DOCUMENTS

| 5,359,518 A | * | 10/1994 | Wimmer ....................... 701/111 |
| 5,381,688 A | | 1/1995 | Ikeda et al. |
| 5,487,008 A | * | 1/1996 | Ribbens et al. .............. 701/110 |
| 5,505,079 A | | 4/1996 | Rossignol |
| 5,708,200 A | | 1/1998 | Rossignol |
| 6,651,490 B1 | * | 11/2003 | Ceccarani et al. ......... 73/117.3 |

FOREIGN PATENT DOCUMENTS

| EP | 0 611 882 | 8/1994 |
| FR | 2 689 934 | 10/1993 |
| FR | 2 718 489 | 10/1995 |

* cited by examiner

Primary Examiner—Hieu T. Vo
(74) Attorney, Agent, or Firm—Young & Thompson

(57) ABSTRACT

A method for detecting combustion failure in an internal combustion engine, by calculating an index $ln(t)$ representing engine irregularities at a moment (t) during certain combustion phases in one cylinder; calculating an observation function $G(t)$, which is a function between index $ln(t)$ and an estimated reference value $In+/-i(t)$ at a different moment during engine operation comparing $G(t)$ to a threshold (S), which is a function of engine load (C) and/or rpm (N); and diagnosing a combustion failure when $G(t)$ exceeds (S) or: $G(t)=In(t)-ln(t)$, wherein $In(t)$ is a function of $ln(t)$ and $In+/-i(t)$ represents the index $ln(t)$ after weighting of the values of said index outside an acceptable predefined differential.

14 Claims, 2 Drawing Sheets

METHOD FOR DETECTING COMBUSTION FAILURE BY FILTERING

CROSS REFERENCE TO RELATED APPLICATIONS

This is the 35 USC 371 National Stage of International Application PCT/EP2004/001247 filed on 11 Feb. 2004, which designated the United States of America.

FIELD OF THE INVENTION

The present invention relates to a method for detecting misfires (or partial combustion) of an air/fuel mixture in the cylinders of an internal combustion engine, particularly an engine propelling a motor vehicle, this method making provision for an index representative of engine operating irregularities to be calculated, preferably during each combustion phase of this mixture in any one of the engine cylinders.

BACKGROUND OF THE INVENTION

Combustion irregularities in an internal combustion engine are useful to diagnose because they point to various disorders likely to affect the operation of the engine.

Patent FR-A-2 689 934 discloses such a method intended more particularly for such diagnostics when an engine is operating at medium and high speed. According to this method, during each combustion phase in any one of the cylinders, collections of time differences $\Delta t_i$ separating predetermined angular positions of the crankshaft are measured, and then, using a linear combination of the time differences from the set, a "critical parameter" or "index" representative of the variations in the rotational speed of the engine (crankshaft) during this combustion phase is calculated and this index is compared with a default threshold in order to diagnose whether a misfire is occurring.

In order to measure the aforementioned time differences which separate various angular positions, a rotary component (or target) secured to the crankshaft is used.

A method of the type described in FR-A-2 689 934 but improved in order to eliminate disturbances in the diagnosis through variations in the geometry of the target is also known, from FR-A-2 718 489.

Methods of the same type, modified in such a way as to prevent a "backup" of forces, resulting from a vehicle propelled by the engine being driven over a surface of irregular geometry from disturbing the diagnostics, and to do so without using a sensor dedicated to detecting such forces are also known.

The solutions hitherto proposed do, despite of everything, have disadvantages which constitute a limitation that it is difficult to accept in the context of a function discerning poor combustion in an engine.

First of all, if the use of an index representative of the variations in the rotational speed of the engine during the combustion phases is in fact appropriate, the parameter best suited to detecting misfires at high engine speeds proves to be sensitive to high-amplitude fluctuations, noise and jolts transmitted typically to the crankshaft through the drive line when a vehicle is in everyday use.

These disturbances may typically be the result of clutch jolts or of driving over a poor road surface. This may in any case lead to an inappropriate discerning of misfires, depending on the intensity of the disturbances, especially at low engine speeds.

Conversely, a parameter that proves to be well suited to detection at low engine speeds is not very sensitive to these high-amplitude fluctuations but does itself have low sensitivity to the speed variations characteristic of an absence of combustion at high speed.

That being the case, the selecting of one parameter from among several according to the conditions of use of the engine, that is to say in "everyday" use, has already been envisaged. However, in this case, each time these conditions of use are altered, a sequence of reinitializing the diagnostics method is needed and may lead to this method being temporarily disabled. The proliferation of these operating/reinitializing sequences around an engine speed or load threshold, when there is a fluctuation or a transient load situation may also interrupt the diagnostics for a relatively long length of time.

It may also be noted that the "critical parameters" or "indices" of the methods of the prior art mentioned hereinabove, and the detection algorithms that use them, prove to be effective only under certain engine load and speed conditions and/or only for certain types of combustion fault. Specifically, in this regard, it is possible to draw a distinction between erratic misfires, systematic misfires (affecting one and the same cylinder for example) and various sequences of misfires affecting different cylinders, for example.

It may also be noted, for example from FR-A-2 689 934, that the parameter used may, under certain conditions, be caused to discern inappropriately between true and false misfires if incorrect target matching occurs, such as happens, for example, if there is an uncontrolled drift in the sensor associated with the crankshaft.

Attempts may be made at alleviating these disadvantages by proliferating the diagnostic processes, each process being tailored to a particular engine operating domain, or to filtering out one particular cause of disturbance of the diagnostics.

However, this approach is cumbersome and expensive, both in terms of process development time for these diagnostic processes and in terms of computation time, when executing these complex processes.

SUMMARY OF THE INVENTION

It is in this context that the purpose of the invention is to provide a solution to the aforesaid disadvantages:

by appreciably reducing the development time needed to produce a reliable detection process, by safeguarding the detection diagnosis against an uncontrolled drift in a component, by corresponding closely to the actual mean conditions of the engine and thus allowing a diagnosis to be carried out for over 90% of the time for which this engine is being used, by avoiding the addition of a sensor which might otherwise be needed for describing the state of the road surface, by suspending diagnosis only for the time strictly necessary for the disturbing phenomenon to disappear, by reacting rapidly, before the critical fault appears, and by requiring no retroactive erasing of faults detected and stored in memory, by safeguarding the combustion irregularities detection diagnosis for at least most of the unlisted limiting cases, by intrinsic inhibition taking account of the confidence level, confidence band and threshold information, as indicated hereinafter.

Thus, at least some of the aforementioned objectives are achieved using a detection method in which:

a) during at least some of the combustion phases in at least one of the cylinders, at an instant (t) of the engine operating cycles, a current value of an index $I_n(t)$ representative of operating irregularities in the engine stroke is calculated, b) while the engine is operating, and on the basis of the current value at the instant t of the index $I_n(t)$, the current value at the same instant t of an observation function G(t) is calculated, this function being a function of an instantaneous discrepancy between said current value at the instant t of the index $I_n(t)$ and an estimated reference value $\bar{I}_{n+i}(t)$ illustrative of this index at a different instant, c) the current value of G(t) is compared with a predetermined threshold (S) dependent on the engine load (C) and/or speed (N), and d) a misfire is diagnosed when the value of G(t) crosses the threshold (S), characterized in that:
the observation function G(t) is such that:

$$G(t) = \bar{I}_n(t) - I_n(t),$$

with $\bar{I}_n(t)$ a function of $I_n(t)$ and $\bar{I}_{n+i}(t)$ and corresponding to a value representative of the index $I_n(t)$ after the values of this index which lie outside a predetermined permissible discrepancy (BC) have been excluded and/or weighted, prior to calculating the function G(t), a value $E_n(t)$ is calculated which expresses the instantaneous discrepancy between said current value, at the instant t, of the index $I_n(t)$ and the corresponding reference value $\bar{I}_{n+i}(t)$ illustrative of this index at a different instant.

In particular, the index $I_n(t)$ may correspond to an estimated value of the engine torque at a given moment in the cycle n.

In order in particular to safeguard the diagnosis against the uncontrolled drift of a component and allow a diagnosis to be made over a very wide engine operating range, an additional feature of the invention advises that $\bar{I}_n(t)$ be calculated from the formula:

$$\bar{I}_n(t) = \bar{I}_{n+i}(t) + a \times E_n(t)$$

where $\underline{a}$ is a function correction coefficient (theoretically of the decreasing monotonous type) correcting $|E_n(t)|$, with $E_n(t) = I_n(t) - \bar{I}_{n+i}(t)$, $\underline{i}$ being an operating cycle different from $\underline{n}$.

As a preference:
the factor $\underline{a}$ will also be a linear function of the dynamics $\Delta N/N$ of the engine, N being the speed of this engine, and $\bar{I}_{n+i}(t)$ will be a filtered estimate, for example a mean of the prior events in which the extraordinary events (leading in particular to values of the function $E_n(t)$ or G(t) above the threshold S or outside BC) are eliminated or weighted.

Furthermore, for the quality of the results, it is advisable for $\underline{n}$ and $\underline{i}$ to be two identical strokes, preferably two combustion strokes, of two successive cycles or cycles separated from one another by five successive cycles at most (see, on this matter, the comments made for engine cycles other than four-cylinder engine cycles).

Furthermore, particularly in order to avoid an additional sensor or information item for describing the condition of the road surface, provision is made, according to a possible additional feature, for the fact that the vehicle propelled by said engine is running along a surface of irregular geometry to be diagnosed when the function $|E_n(t)|$ adopts several consecutive values lying between the maximum value, at the instant considered, of said predetermined permissible discrepancy (BC) and the threshold S, this diagnosis inhibiting the diagnosis of a misfire at step d).

As a preference, the width of this "confidence band" BC will be a function of the variance of the function G(t).

Advantageously, the invention makes provision for the inhibition of a misfire diagnosis to be supplemented by the opening of a time window (fixed period of time initiated by the detection of running over an irregular surface) during which no misfire is logged, because then this event is due to the running conditions rather than to poor engine operation. This time window is extended as long as the engine management system detects that that vehicle is running over an irregular surface.

Furthermore, still with reliability in mind, in order to safeguard the diagnosis and provide particularly rapid adaptation to the actual operating conditions, in the context of the most universal diagnosis possible, it is advisable for the index $I_n(t)$ to be calculated on the basis of a linear combination of at least two elementary indices ($I_1, I_2, I_3, \ldots$) each representative of the operating irregularities of the engine in a predetermined operating domain ($\Delta C, \Delta N$) of the engine, (that is to say for speed and load obtained in more or less identical operating conditions on a reference engine), the elementary indices ($I_1, I_2, I_3, \ldots$) being weighted, in the combination, by predetermined relevance coefficients ($\alpha, \beta, \gamma, \ldots$) therefore also obtained under more or less identical operating conditions on a reference engine.

It will also be noted that, in this description, the term "cycle" corresponds to the space of time separating two active top dead centers of a cylinder, an "active top dead center" (ATDC) corresponding to the angular position of the crankshaft which precedes the expansion of the gases, namely the minimum distance between the piston and the top of the cylinder head of this engine.

In relation with that and the moments at which the readings prior to calculating the index are taken, it is advisable for the values of $I_n(t)$ and $I_{n+i}(t)$ calculated to correspond to current values, at operating instants (typically centers of combustion lying a few degrees after ATDC, their precise position varying according to the type of engine) belonging to two consecutive engine operating cycles or to cycles five consecutive cycles apart at most. Thus, the detection reliability will be improved.

The value of five cycles is given for a four-cylinder engine and corresponds to 720° crank angle. For a different engine architecture, the optimum number of cycles will be established bearing this comment in mind.

BRIEF DESCRIPTION OF THE DRAWINGS

An even more detailed description of the invention will now be provided with reference to the attached drawings in which.

DETAILED DESCRIPTION OF THE INVENTION

Figure 1:
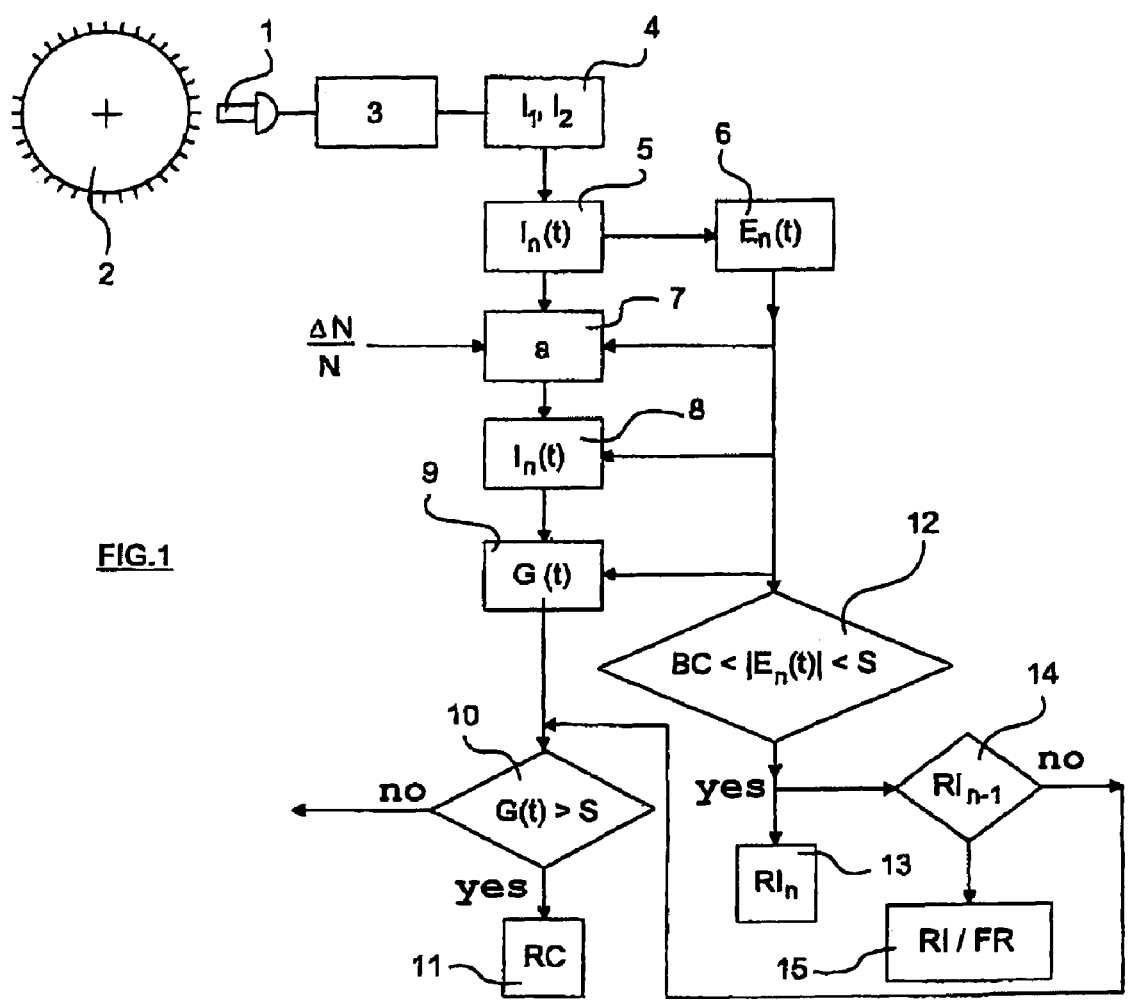
FIG. 1 is a flow diagram setting out the steps of a method according to that of the invention.

In FIG. 1, it can be seen that the method according to the invention makes use of the signals conventionally delivered by a position sensor 1, of the magnetic reluctance type for example, sensitive to the passage of the teeth of a toothed wheel 2, or target, fixed on the output shaft of an internal combustion engine (not depicted).

The angular position sensor 1 is thus firmly secured to a fixed part of the engine facing the wheel 2 which is therefore secured to the crankshaft. Typically, the wheel bears a series of uniformly spaced identical teeth and one individual tooth (for example of a width equal to the width of three ordinary teeth), the absolute position of which is perfectly known with respect to the crankshaft. This sensor delivers a signal Sc containing, for each revolution of the crankshaft, data about the angular position corresponding to the passing of each ordinary tooth and an absolute position information item corresponding to the passing of the individual tooth. This data may consist in a series of pulses, after shaping in electronic processing means associated with the sensor. The absolute position data allow the position of the active top dead centers to be determined. A counter receives the signal Sc and delivers the time difference values $\Delta t_1$, $\Delta t_2$, ... by measuring the times separating the passing of predetermined teeth past the sensor. These time differences are logged in a memory of the computer provided on board the vehicle and processed by this computer. These calculation means are programmed to group the time difference values together into collections of samples $\Delta t_1$, $\Delta t_2$, ... from which the critical parameter is calculated.

Thus, having been shaped, the signals delivered by the sensor 1 are used in step 3 to calculate this critical parameter, or index, representative of the engine operating irregularities, which are therefore assumed to result, in particular, from misfires. In fact, this index is representative of variations in the instantaneous rotational speed of the engine at the chosen instant in the cycle (preferably at a reference instant in the combustion phase), with respect to the mean speed between two consecutive active top dead centers, for example.

The calculated index adopts the form of a linear combination of time differences $\Delta t_i$ (acquired at step 3) separating predetermined angular positions of the engine crankshaft recorded by virtue of the signal delivered by the sensor 1.

Thus, in each sampling window, a series of time difference measurements, for example angularly distributed about a reference position, is taken with a view to obtaining the aforementioned set of samples $\Delta t_i$ over said window, after which, for each set of samples, a linear combination of these measured $\Delta t_i$ values is determined, so as to obtain the relevant index (step 5).

As in the aforementioned french patent FR-A-2 689 934, in the engine operator cycle $i$ and at the instant $t$ in the cycle, this linear combination $I_n(t)$ can be expressed by the relationship:

$$I_i(t) = -\Delta t_1 - 3\Delta t_2 - 2\Delta t_3 + 2\Delta t_4 + 3\Delta t_5 + \Delta t_6$$

with a possible weighting by a factor $1/t^3$ where $t$ is a parameter proportional to the time it takes for the wheel 2 to rotate. Thus, preferably for each cycle or for a selected series of cycles, a specific instant (for example the "center of combustion" positioned a few degrees—depending on the engine concerned—after ATDC) is monitored determining, by simple linear combinations, a parameter representative of the variation in the instantaneous speed of the engine, that is to say the acceleration, at that instant.

However, this parameter could be considered to be merely an elementary index, the (even more) representative "general" index (termed $I_n(t)$) then being a linear combination of at least two elementary indices such as $I_1(t)$, $I_2(t)$, $I_3(t)$, each tailored to a particular engine operating domain defined by particular ranges of variation $\Delta C$ in the load C and $\Delta N$ in the speed N of this engine, each elementary index then being obtained by measuring time differences separating predetermined angular positions of the rotating component secured to the crankshaft.

Such calculations, such as those mentioned elsewhere in this description, are executed by the computer held on board the vehicle which manages the engine operation and is duly programmed for that purpose.

Thus, it is in step 4 of the flow diagram of FIG. 1, while the vehicle is in everyday use, that the aforementioned various indices $I_1(t)$, $I_2(t)$, $I_3(t)$, ..., can be calculated.

In this assumption, in the next step 5, the current value $I_n(t)$ of the index adopted is calculated such that:

$$I_n(t) = \alpha I_1(t) + \beta I_2(t) + \gamma I_3(t),$$

where $\alpha$, $\beta$, $\gamma$ are "relevance" coefficients drawn from a memory unit (table) where these coefficients are stored after bench tests as a function of the engine load C and speed N. These coefficients are used, in the expression of $I_n(t)$ to weight the associated indices according to the greater or lesser proximity of the instantaneous (current) engine operating point (C, N) to the operating domain ($\Delta C$, $\Delta N$) associated with each elemental index. In a known way, the load may be measured by any conventional means (intake manifold, depression, airflow rate, etc), while the engine speed can be recorded for each revolution of the engine using conventional means.

Whether the calculation of $I_n(t)$ has been performed on the basis of a linear combination of one or several indices, such as the elemental indices $I_1$, $I_2$, $I_3$ ..., the computer memory then possesses the values $I_n(t)$, $I_{n-i}(t)$ or even $I_{n+i}(t)$, $n$ and $i$ being two different engine operating cycles, $t$ always being the characteristic instant of the measurement (the center of combustion for example), the cycles concerned also preferably being consecutive or at least five consecutive cycles apart at most, the figure of five cycles having been chosen as illustrating the relative proximity and time between the values taken into consideration for a four-cylinder engine so as, in particular, to avoid overloading the memory of the computer.

The value of five cycles, given for a four-cylinder engine, corresponds to 720° crank angle. For a different engine architecture, the optimum number of cycles will be established bearing this comment in mind.

In that which follows, it will be considered that the indices $I_n(t)$ and $I_{n-1}(t)$ at the center of combustion (close to ATDC) of two successive cycles (n−1 and n) of a four-cylinder engine have been taken into consideration.

In step 6, a function $E_n(t)$ is then calculated such that $$E_n(t) = I_n(t) - \bar{I}_{n-1}(t),$$

bearing in mind that, in our example, the values of the indices $I_n(t)$ and $\bar{I}_{n-1}(t)$ over two successive cycles (n−1 and n) have been taken into consideration.

$\bar{I}_{n-1}(t)$ is a filtered value, having passed through a non-linear digital filter. $\bar{I}_{n-1}(t)$ may, for example, be a mean of the preceding samples, it being understood that the extraordinary values, that is to say those which diverge (outside a range of authorized values) from the normally expected value are either excluded from the calculation or weighted so that their effect on $\bar{I}_{n-1}(t)$ is reduced.

The calculation of the function $E_n(t)$, then illustrative of the operation at the instant t of the cycle $n$, is then used for calculating, in step 7, a weighting coefficient $a$, a linear function of $|E_n(t)|$, and of $\Delta N/N$, that is to say of the dynamics of the engine at the instant $t$ concerned.

In particular, this coefficient a may be such that:

$$a = a_0 \times [1 - \min(|E_n(t)|/(n \times \text{Variance}(\text{Combustion})), 1)]$$

with n=4 and $a_0$=0.2 for example.

The weighting coefficient a is then used to calculate, in step 8, the value, still at the instant t of the cycle n involved, of $$\bar{I}_n(t)=\bar{I}_{n-1}(t)+a \times E_n(t).$$

And this value is itself used to calculate, in step 9, the observation function G(t) such that:

$$G(t)=\bar{I}_n(t)-I_n(t)$$

In step 10, the value (possibly the absolute value) of this observation function is compared with a threshold value S which is a function of the engine speed N and load C at the instant concerned of the cycle involved. The value of the threshold S is typically established by bench testing so that a crossing of the threshold by the function G(t) is sure to correspond, at the instant of this crossing, to a misfire (RC) thus diagnosed (in step 11).

The default threshold S with which the critical parameter G(t) is compared could be calculated from the engine speed and load. Another solution is to carry out and log, during bench tests beforehand, a map of default thresholds, providing a default threshold value for each engine speed and each mean load applied. In each cycle, while the vehicle is moving along normally (and in particular through a conventional measurement at each top dead center), the current engine speed and the mean current load applied are then detected and the corresponding default threshold is extracted from the memory unit so that the abovementioned comparison can be made.

It will also be noted that the map of default thresholds may have been defined beforehand on test bench by artificially provoking a combustion defect at predetermined speeds and loads, taking the aforementioned time difference measurements ($\Delta t_i$) and calculating the corresponding critical index or indices and also storing some of these indices in memory as default threshold(s).

Figure 2:
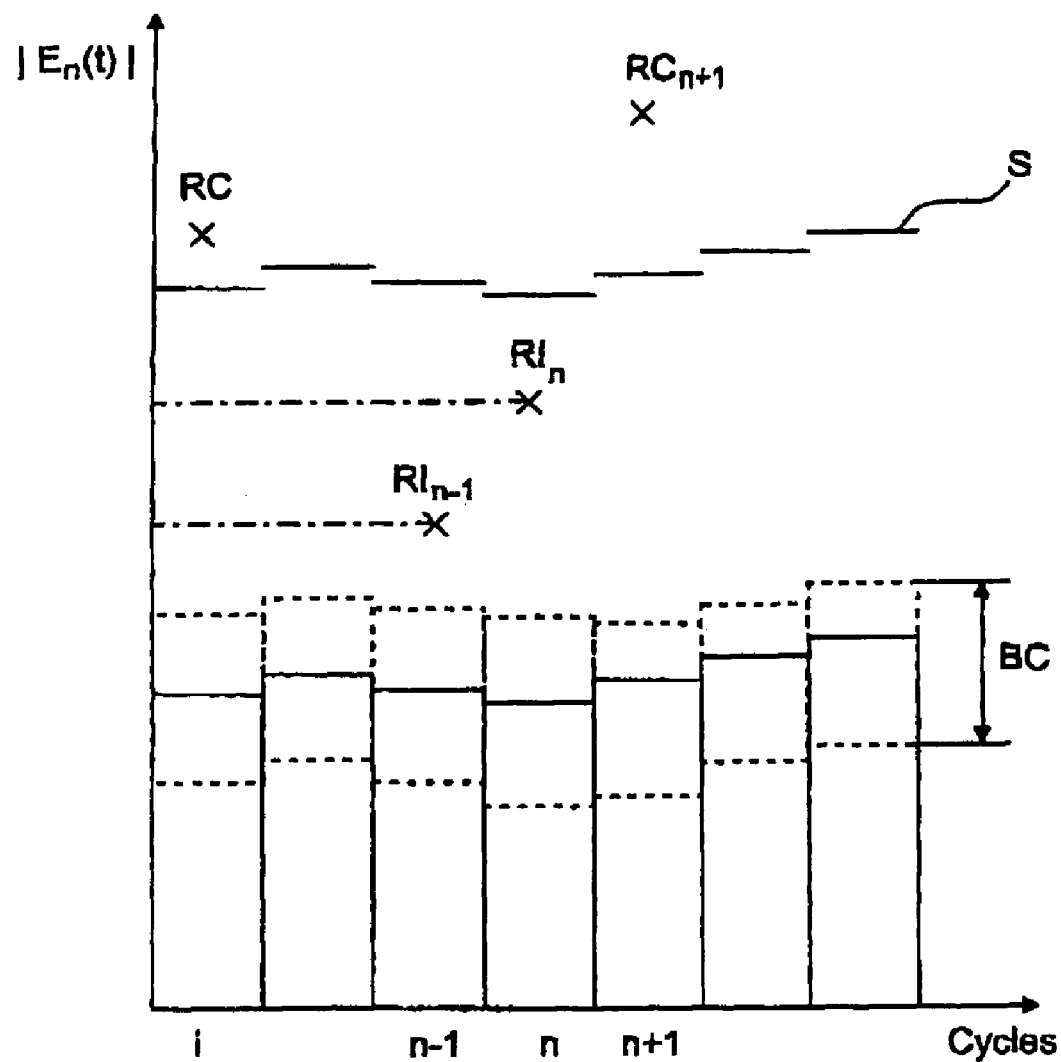
FIG. 2 is a graph useful in describing the diagnosis that is established in accordance with the method of the invention.

A crossing of a threshold, in a particular cycle I, is illustrated by the reference point RC in FIG. 2 which depicts one possible graph of the evolution of the threshold S with time (or in the succession of cycles) as a function of the evolutions in the engine speed N and load C.

FIG. 2 also depicts a "confidence band" BC corresponding to permissible discrepancies in the variation of $|E_n(t)|$ from which it is improbable that $|E_n(t)|$ will depart, in the absence of extraordinary accidents likely to affect the regularity of the operation of the engine (misfires, driving over irregular surfaces, etc). This confidence band is therefore typically a function of the normal variance of $|E_n(t)|$.

If, during the cycle n (see FIG. 2, point referenced $RI_n$ and test step 12 in FIG. 1), the function of $|E_n(t)|$ adopts a value lying between the confidence band BC (more precisely the maximum value of the confidence band at the instant concerned) and the threshold S, then step 13 diagnoses an operating irregularity $RI_n$. A check is then carried out in cycle n−1 (step 14) to check whether an operating irregularity $RI_{n-1}$ satisfying the same conditions (BC<$|E_{n-i}(t)|$<S) had been detected.

If, during consecutive cycles n−1 and n the values of $|E_{n-1}(t)|$ and of $|E_n(t)|$ generated operating irregularities, then the definitive diagnosis RI (step 15) is emitted. The detected anomaly is then due to the vehicle propelled by this engine driving over an irregular surface, which driving causes a backup of forces on the engine crankshaft, disrupting the uniformity with which the latter rotates.

Simultaneously with the definitive diagnosis RI of step 15, an index FR is activated (memory switching from the value 0 to the value 1 for example). This index makes it possible for the computer to trigger a time window of fixed duration, for example lasting 300 ms, during which no RC (combustion fault) diagnosis will be made and logged (step 11) because the computer has demonstrated that the reason for the extraordinary event is the driving over an irregular surface. Thus, the point $RC_{n+1}$ (FIG. 2) of the cycle n+1 immediately following the cycle n will not be logged as a misfire.

If the driving over an irregular surface continues, a succession of diagnoses RI is generated, and this inhibits step 11 and initializes the index FR a corresponding number of times, thus prolonging the duration of the time window during which the RC diagnosis is not logged.

Throughout the time of this inhibition, the computer will continue its operations and checks and as soon as two consecutive values no longer reveal that an irregular surface is being driven over, the misfire diagnosis may be reinstalled, once the time window generated by the index FR has elapsed.

For the diagnosis process set out hereinabove to operate correctly, a reinitialization (rezeroing) of the RC and RI and FR alert emissions will be performed before each iteration of the calculations.

It is now clear that the invention does indeed make it possible to achieve the stated goals namely, in particular, of providing a reliable diagnosis as regards the occurrence of misfires in an internal combustion engine, and to do so regardless of the circumstances likely to affect the dependability of this diagnosis.

This advantageous result is therefore obtained on the one hand by virtue of the tailoring described hereinabove of the sampling of the index I considered, taken into consideration in the calculation of $\bar{I}$, of the various evolutions that may affect the operation of the engine, whether these evolutions be normal (speed transitions), accidental (misfires, driving over irregular surfaces) or systematic (wear, drift, etc) and, on the other hand, by virtue of the tailoring of the index I itself to these same evolutions.

The invention claimed is:

1. A method of detecting misfires of a mixture between a fuel and an oxidizing agent, in any one of the cylinders of an internal combustion engine having multiple-stroke operating cycles, such as two-stroke or four-stroke cycles, this method comprising the following steps:
   a) during at least some of the combustion phases in at least one of the cylinders, at an instant (t) of the engine operating cycles, a current value of an index $I_n(t)$ representative of operating irregularities in the engine stroke is calculated,
   b) while the engine is operating, and on the basis of the current value at the instant t of the index $I_n(t)$, the current value at the same instant t of an observation function G(t) is calculated, this function being a function of an instantaneous discrepancy between said current value at the instant t of the index $I_n(t)$ and an estimated reference value $\bar{I}_{n+i}(t)$ illustrative of this index at a different instant,
   c) the current value of G(t) is compared with a predetermined threshold (S) dependent on the engine load (C) and/or speed (N), and
   d) a misfire is diagnosed when the value of G(t) crosses the threshold (S), characterized in that:
   the observation function G(t) is such that:

$$G(t)=\bar{I}_n(t)-I_n(t),$$

with $\bar{I}_n(t)=\bar{I}_{n+i}(t)+a \times E_n(t)$ $\bar{I}_n(t)$ corresponding to a value representative of the index $I_n(t)$ after the values of this index that lie outside a predetermined permissible discrepancy (BC) have been excluded and/or weighted and where $\underline{a}$ is a correction coefficient dependent on $|E_n(t)|$, and $E_n(t)=I_n(t)-\bar{I}_{n+i}(t)$, $\underline{i}$ being an operating cycle different from $\underline{n}$, $E_n(t)$ being an expression of the instantaneous discrepancy between said current value at the instant t of the index $I_n(t)$ and the corresponding reference value $\bar{I}_{n+i}(t)$ illustrative of this index at a different instant.

2. The method as claimed in claim 1, characterized in that the coefficient $\underline{a}$ is also a linear function of the dynamics $\Delta N/N$ of the engine, N being the engine speed of this engine.

3. The method as claimed in claim 2, characterized in that $\bar{I}_{n+i}(t)$ is a mean of the values I(t) representative of operating irregularities of the engine over time, this mean eliminating or weighting the values which are remote from the expected normal value.

4. The method as claimed in claim 2, characterized in that $\underline{n}$ and $\underline{i}$ are two identical engine strokes, preferably two combustion strokes, of two successive cycles or cycles separated from one another by 720° crank angle at most.

5. The method as claimed in claim 2, characterized in that the fact that a vehicle propelled by said engine is running over a surface or irregular geometry is diagnosed when the function $|E_n(t)|$ adopts at least two consecutive values lying between the maximum value, at the instant considered, of predetermined permissible discrepancy (BC) and the threshold S, this diagnosis inhibiting that of a misfire at step d).

6. The method as claimed in claim 1, characterized in that $\bar{I}_{n+i}(t)$ is a mean of the values I(t) representative of operating irregularities of the engine over time, this mean eliminating or weighting the values which are remote from the expected normal value.

7. The method as claimed in claim 1, characterized in that $\underline{n}$ and $\underline{i}$ are two identical engine strokes, preferably two combustion strokes, of two successive cycles or cycles separated from one another by 720° crank angle at most.

8. The method as claimed in claim 1, characterized in that the fact that a vehicle propelled by said engine is running over a surface or irregular geometry is diagnosed when the function $|E_n(t)|$ adopts at least two consecutive values lying between the maximum value, at the instant considered, of predetermined permissible discrepancy (BC) and the threshold S, this diagnosis inhibiting that of a misfire at step d).

9. The method as claimed in claim 8, characterized in that the predetermined permissible discrepancy (BC) has a width dependent on the variance of the function $|E_n(t)|$.

10. The method as claimed in claim 9, characterized in that the diagnosis that the vehicle propelled by the engine is running over a surface of irregular geometry generates a time period during which no misfire diagnosis is logged.

11. The method as claimed in claim 8, characterized in that the diagnosis that the vehicle propelled by the engine is running over a surface of irregular geometry generates a time period during which no misfire diagnosis is logged.

12. The method as claimed in claim 11, characterized in that the period of time for which no misfire diagnosis is logged is extended as long as the detection that the vehicle is running over a surface of irregular geometry continues.

13. The method as claimed in claim 1, characterized in that the index $I_n(t)$ corresponds to an estimate of the value of the engine torque at a given moment in the cycle n.

14. The method as claimed in claim 1, characterized in that the index $I_n(t)$ is calculated on the basis of a linear combination of at least two elementary indices ($I_1$, $I_2$, $I_3$, ...) each representative of engine operating irregularities in a predetermined operating domain ($\Delta C$, $\Delta N$) of this engine dependent on the load (C) and/or on the speed (N) at a given moment, the elementary indices ($I_1$, $I_2$, $I_3$, ...) being weighted, in the combination, by predetermined relevance coefficients ($\alpha$, $\beta$, $\gamma$, ...) obtained in roughly identical operating conditions on a reference engine.

\* \* \* \* \*